United States Patent
Richardson et al.

(10) Patent No.: US 7,303,205 B2
(45) Date of Patent: Dec. 4, 2007

(54) ANTI-SWAY BAR CONTROLLER

(76) Inventors: James Richardson, 37308 Chestnut Mountain Rd., Damascus, VA (US) 24236; Ralph Sheets, 19417 County Park Rd., Abingdon, VA (US) 24211

( * ) Notice: Subject to any disclaimer, the term of this patent is extended or adjusted under 35 U.S.C. 154(b) by 415 days.

(21) Appl. No.: 11/110,322

(22) Filed: Apr. 20, 2005

(65) Prior Publication Data

US 2005/0230932 A1  Oct. 20, 2005

Related U.S. Application Data

(60) Provisional application No. 60/563,721, filed on Apr. 20, 2004.

(51) Int. Cl.
*B60D 1/30* (2006.01)
(52) U.S. Cl. .................... 280/455.1; 254/424
(58) Field of Classification Search ................ 254/424, 254/425, 98, DIG. 2; 280/455.1
See application file for complete search history.

(56) References Cited

U.S. PATENT DOCUMENTS

| | | | | |
|---|---|---|---|---|
| 4,154,454 A | * | 5/1979 | Lewin | .................. 280/455.1 |
| 6,286,851 B1 | * | 9/2001 | Sargent | .................. 280/455.1 |
| 6,860,501 B2 | * | 3/2005 | Schmidt et al. | .......... 280/455.1 |
| 7,137,643 B1 | * | 11/2006 | Hsueh | ..................... 280/455.1 |
| 2002/0190498 A1 | * | 12/2002 | Schmidt et al. | .......... 280/455.1 |
| 2006/0261573 A1 | * | 11/2006 | Hsueh | ..................... 280/455.1 |

* cited by examiner

*Primary Examiner*—Paul N. Dickson
*Assistant Examiner*—Drew J. Brown
(74) *Attorney, Agent, or Firm*—Jeffrey K. Seto

(57) ABSTRACT

A device for selectively compressing and decompressing an anti-sway bar. The device replaces the hand crank on traditional anti-sway bars and relieves drivers of having to get our to their vehicles to compress or decompress the anti-sway bar by hand. A lever is used to compress the anti-sway bar. The lever's head is attached to the anti-sway bar at the same position as the old hand crank, using the bolts and nuts from the hand crank. The lever is raised with the assistance of an electric motor that is controlled by a switch in the cab of the towing vehicle. The motor turns a screw that extends through a nut in the handle of the lever. Micro-switches are used to automatically stop the electric motor when the lever has reached a desired position.

15 Claims, 3 Drawing Sheets

ANTI-SWAY BAR CONTROLLER

The present invention was originally disclosed in U.S. provisional patent application Ser. No. 60/563,721 filed on Apr. 20, 2004, and priority is claimed to the provisional patent application.

BACKGROUND OF THE INVENTION

The present invention relates generally to the field of anti-sway bars and more specifically to a device that can be added to a traditional anti-sway bar that allows for remote control of the clamping pressure applied to the anti-sway bar.

Anti-sway bars are routinely attached between vehicles and trailers to control swaying of trailers as they are towed behind the vehicles. An anti-sway bar is typically attached to the rear of the towing vehicle and the front of the trailer, on or near the main trailer hitch assembly. Traditional anti-sway bars have three basic parts: a large hollow (outer) bar that attaches to the trailer; a smaller solid (inner) bar that attaches to the vehicle, the inner bar being able to slide in and out of the outer bar; and a hand crank that can clamp down on the inner bar by applying pressure to a flexible surface on the outer bar. When the hand crank is tightened the clamping pressure exerted on the interior bar greatly reduces the movement of the interior bar. Instead of moving freely in and out of the outer bar, it now takes a great deal of force to make the inner bar slide. When the hand crank is loosened the inner bar is able to slide in and out of the outer bar with very little force. This allows the anti-sway bar to extend and contract between different lengths.

Prior to getting on a highway, or soon after entering a highway, drivers must get out of their cars and tighten the hand crank on traditional anti-sway bars. This holds the anti-sway bar in at a semi-fixed length and prevents the towed trailer from swaying back and forth behind the vehicle. In a similar fashion, prior to leaving a highway or soon after leaving the highway, drivers must pull over, get out of their vehicles again and loosen the hand crank on traditional anti-sway bars. This allows the driver to maneuver their vehicle and trailer through city streets and gas stations. If a driver forgets to loosen his anti-sway bar prior to maneuvering around corners, or through parking lots, the anti-sway bar may either bend or break, and will likely cause damage to the towing equipment.

Leverage is a principle of engineering that involves the use of a lever and a fulcrum. A lever is a simple machine usually consisting of a rigid bar or rod that is designed to rotate about a fixed point, the fulcrum. The effect of any force applied to a lever is to rotate the lever about the fulcrum. The rotational force is in direct proportion to the distance between the fulcrum and the applied force. For example, a mass of 1 kg, 2 m from the fulcrum, can balance a mass of 2 kg at a distance of 1 m from the fulcrum. In the crowbar, one type of lever, a relatively small effort is applied at the end farthest from the fulcrum to lift a heavy weight that is close to the fulcrum.

Electric motors are devices that can convert electrical energy into mechanical energy, by electromagnetic means. Electric motors take advantage of the principle of electromagnetic reaction, first observed by the French physicist André Marie Ampère in 1820, which states that if a current is passed through a conductor located in a magnetic field, the field exerts a mechanical force on it. Both motors and generators consist of two basic units, the field, which is the electromagnet with its coils, and the armature, the structure that supports the conductors, which cut the magnetic field and carry the exciting current in a motor. The armature is usually a laminated soft-iron core around which conducting wires are wound in coils.

When current is passed through the armature of a DC motor, a torque is generated by magnetic reaction, and the armature revolves. The action of the commutator and the connections of the field coils of motors are precisely the same as those used for generators. The revolution of the armature induces a voltage in the armature windings. This induced voltage is opposite in direction to the outside voltage applied to the armature, and hence is called back voltage or counter electromotive force (emf). As the motor rotates more rapidly, the back voltage rises until it is almost equal to the applied voltage. The current is then small, and the speed of the motor will remain constant as long as the motor is not under load and is performing no mechanical work except that required to turn the armature. Under load the armature turns more slowly, reducing the back voltage and permitting a larger current to flow in the armature. The motor is thus able to receive more electric power from the source supplying it and to do more mechanical work.

The speed at which a DC motor operates depends on the strength of the magnetic field acting on the armature, as well as on the armature current. The stronger the field, the slower is the rate of rotation needed to generate a back voltage large enough to counteract the applied voltage. For this reason the speed of DC motors can be controlled by varying the field current.

Micro-switches are small electromechanical devices that can be used to selectively complete a circuit and or break (open) a circuit. Micro-switches use some received mechanical force to either complete or open the circuit. A micro-switch placed at the bottom of a garage door can be used to shut off the motor used to close the garage door when the bottom of the door comes into contact with the floor of the garage. A trigger on the micro-switch, usually a small strip of metal that extends out of the switch, touches the garage floor just prior to the arrival of the door. The garage floor applies pressure on the switch's trigger, which completes a circuit for sending an "off" signal to the garage door motor.

A screw or bolt is mechanical fastening device consisting essentially of an inclined plane wound spirally around a cylinder or a cone. The ridges formed by the winding planes are called threads, and depending on the intended use, the threads may be square, triangular, or rounded in cross section. The distance between two corresponding points on adjacent threads is called the pitch. If the thread is on the outside of a cylinder, it is called a screw or male thread, and if it is on the inside of a cylinder, it is called a female screw or nut. Screws and bolts used in machines employ a cylindrical shaft with a constant inner or minor diameter. The use of the screw as a simple device realizes the mechanical advantage of the inclined plane. This advantage is increased by the leverage usually applied to the turning of the cylinder, but is decreased by the high frictional losses in a screw-type system. The frictional forces, however, make screws effective fasteners.

Screws have a wide variety of uses. Screw jacks enable a person to raise heavy objects such as automobiles off the ground. The screw can also provide carefully controlled forward and backward motion relative to a connected machine member, as in a micrometer, which can measure distances to within 2.54 micrometers ($1/10,000$ in). The controlled motion is also used in various machine tools, such as lathes, where the cutting tools can be advanced with a high degree of precision.

A gear is a toothed wheel or cylinder that is used to transmit rotary motion from one part of a machine to another. Two or more gears, transmitting motion from one shaft to another, constitute a gear train. The simplest gear is the spur gear, a wheel with teeth cut across its edge parallel to the axis. Spur gears transmit rotating motion between two shafts or other parts with parallel axes. In simple spur gearing, the driven shaft revolves in the opposite direction to the driving shaft. If rotation in the same direction is desired, an idler gear is placed between the driving gear and the driven gear. The idler revolves in the opposite direction to the driving gear and therefore turns the driven gear in the same direction as the driving gear. In any form of gearing the speed of the driven shaft depends on the number of teeth in each gear. A gear with 10 teeth driving a gear with 20 teeth will revolve twice as fast as the gear it is driving, and a 20-tooth gear driving a 10-tooth gear will revolve at half the speed. By using a train of several gears, the ratio of driving to driven speed may be varied within wide limits.

SUMMARY OF THE INVENTION

A device that is adapted for attachment to a traditional anti-sway bar. The device replaces the hand crank on the anti-sway and is able to serve the same function as the hand crank without any need of manual hand cranking. The device is also adapted to use the two bolts that were used to attach the hand crank to the anti-sway bar. The device comprises a lever with a lever head at one end and a handle at the opposite end. The lever head is attached to the anti-sway bar by the two bolts, and the handle portion of the lever includes a nut. A lower micro-switch is attached to the left side of the handle. The lower micro-switch has a lower trigger that extends downward from the handle. An upper micro-switch is attached to the right side of the handle. The upper micro-switch has an upper trigger that extends upward from the handle. A screw, with a base near the top of the anti-sway bar, has a length that extends upward from the anti-sway bar. The screw is threaded through the nut in the handle of the lever. An upper stop is fixed at a position along the length of the screw that is above the handle. A lower stop is fixed at a position along the length of the screw that is below the handle. An electric motor provides the rotational force for turning the screw. The electric motor is mechanically connected to the screw by one or more gears and electrically connected to the upper and lower micro-switches by wires. A control switch that is electrically connected to the motor enables a user to selectively send a first current to the motor that causes the motor to turn in a first direction, and a second current to the motor that causes the motor to turn in a second direction.

When the upper micro-switch contacts the upper stop the upper micro-switch sends a first stop signal to the motor. The first stop signal causes the first current to stop flowing to the motor. When the lower micro-switch contacts the lower stop the lower micro-switch sends a second stop signal to the motor. The second stop signal causes the second current to stop flowing to the motor. Electrical power is preferably provided to the device from the vehicle's electrical system.

It is an object of the present invention to alleviate the need for drivers to get out of their vehicles to tighten and loosen anti-sway bars.

BRIEF DESCRIPTION OF THE DRAWINGS

The invention of the present application will now be described in more detail with reference to the accompanying drawings, given only by way of example, in which.

DETAILED DESCRIPTION OF THE INVENTION

The present invention takes the tedious nature out of changing anti-sway bars between a semi-fixed position and a freely extendable position. The present invention provides powerful, automated pressuring bearing on anti-sway bars that prevents the anti-sway bar from extending and contracting freely. The present invention can also automatically release the pressure on the anti-sway bar and allow the bar to freely flex between different lengths. In the preferred embodiment, a three-position switch is provided on the dashboard of the towing vehicle; or anywhere in the interior of the vehicle that can be reached easily by the driver. Without getting out of the vehicle, the driver can flip the switch to the "compress" position and cause a great amount of pressure to be exerted on the anti-sway bar that greatly reduces the flexibility of the anti-sway bar. The driver can then tow the trailer at highway speeds without having the trailer sway back and forth. Prior to getting off of the highway, or soon after, the driver can flip the switch to the "release" position and the pressure on the anti-sway bar is automatically released. This allows the driver to navigate corners without damaging the anti-sway bar, the towed trailer or the towing vehicle.

Figure 1:
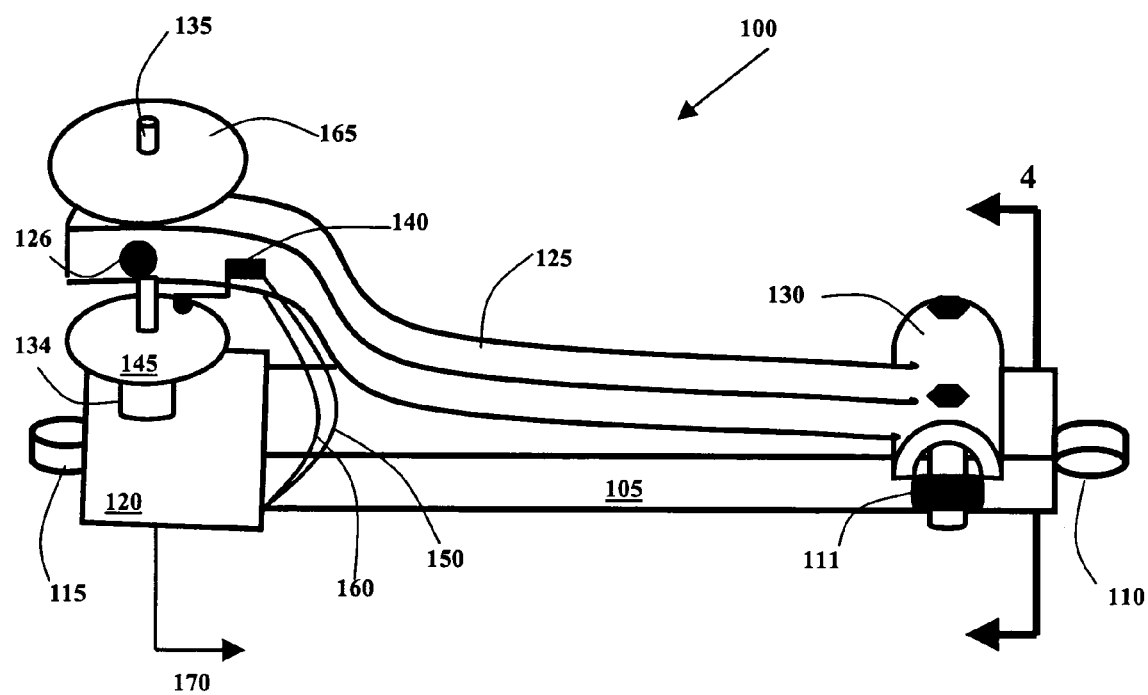
FIG. 1 is a perspective view of the right side of the preferred embodiment in its operational position.

FIG. 1 shows the preferred embodiment 100 in its operational position; attached to a traditional anti-sway bar 105, minus the traditional hand crank used to compress the anti-sway bar. The preferred embodiment comprises gear housing 120, lever 125, lever nut 126, lever head 130, screw 135, lower micro-switch 140, lower stop 145, upper stop 165, signal wires 150 and 160, and control and power line 170. The anti-sway bar 105 includes couplers 110 and 115. Coupler 110 is adapted for attachment to the rear of the towing vehicle, and couple 115 is adapted for attachment to the towed trailer. The anti-sway bar also includes two nuts, on opposite sides of the bar, for accepting two bolts from the clamping mechanism. Only one of the nuts 111 is visible in the view of FIG. 1. It should be noted that the preferred embodiment 100 re-uses the two bolts that were provided with the traditional hand clamp, so there are never any retrofitting problems.

The preferred embodiment 100 is designed to allow a driver flip a switch, or push a button, in the cab of the vehicle that either compresses the anti-sway bar 105 or releases the pressure on the bar. When the driver flips the switch to the "compressed" position, for highway driving, the screw 135 is caused to rotate in the clockwise direction, when viewed from above. This rotation forces the screw 135 to try and extract itself from the nut 126. However, since the screw 135 is in a fixed position, the nut 126 and lever 125 are forced upward. This upward force is multiplied by the principles of leverage and applied at the opposite end of the lever where the lever head 130 transfers the multiplied force to the surface of the anti-sway bar 105, at the same location where pressure would have been applied by the hand clamp. The design of the present lever head 130 optimizes this transfer of force. The result is that the interior arm of the anti-sway bar 105 is compressed and its movement is restricted. In this compressed position, the driver is ready to safely obtain highway speeds with his trailer. When the driver is ready to leave the highway he can decompress the anti-sway bar by moving the control switch in the cab to the "release" position. This will cause the screw 135 to rotate in the counter-clockwise direction, which will pull the nut 126 and lever 125 toward the lower stop 145 and release the pressure on the interior arm of the anti-sway bar 105. The driver can then turn the vehicle and trailer around corners without damaging any equipment.

The control and power line 170 connects the control switch in the cab of the vehicle to the motor and also supplies power to the motor. When the driver moves the control switch to the "release" position, the lever travels downward until the lower micro-switch 140 contacts lower stop 145. When this contact takes place, lower micro-switch 140 sends a signal via wire 150 to the electric motor (shown in FIG. 2) that stops the motor from rotating and ceases movement of the lever 125. The lower stop 145 is permanently attached to screw 135 and does not move up or down when the screw is turned. Wire 160 connects the motor to the upper micro-switch (shown in FIG. 5).

The present invention is advantageously designed so that it can be retrofitted on existing anti-sway bars, making it very easy for users to upgrade their existing towing hardware. The user merely removes the hand crank from a traditional anti-sway bar and replaces it with the preferred embodiment 100. The lever head 130 of the present invention aligns with the nut(s) 111 on the traditional anti-sway bar 105. The bolts that came with the hand crank are also used to attach the lever head 130 to the nut(s) 111 of the traditional anti-sway bar 105. After retro-fitting, instead of a bolt being tightened down by a hand crank, a lever 125 is now raised by an electric motor to apply pressure on the interior bar and keep the anti-sway bar 105 at a semi-fixed length.

Figure 4:
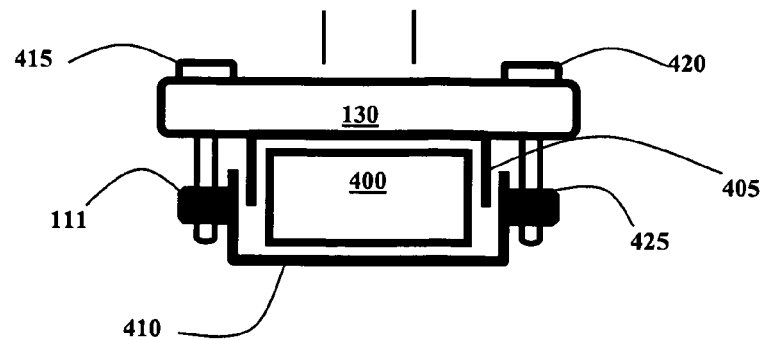
FIG. 4 is a cross-sectional view of the front of a traditional anti-sway bar with the preferred embodiment attached; and, FIG. 5 is close-up side view of the left side of the lifting mechanism and the lever.

The dark arrows next to the number 4 in FIG. 1 indicate the perspective provided in the cross-section view of FIG. 4.

Figure 2:
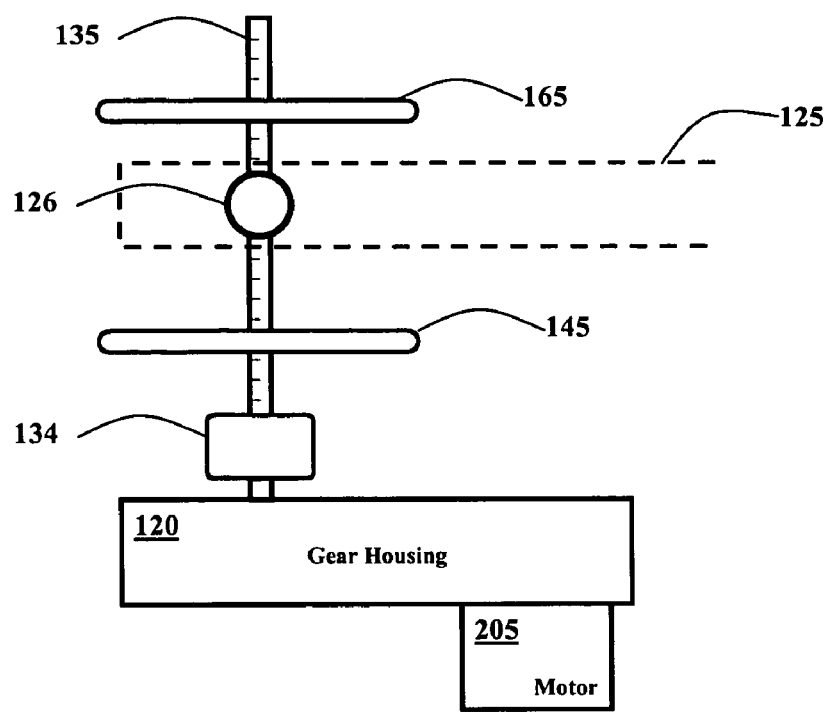
FIG. 2 is a side view of the lever lifting mechanism of the preferred embodiment.

FIG. 2 is a close up view of the lifting mechanism of the preferred embodiment. The upper and lower stops 165 and 145 respectively, are circular metal disks in the preferred embodiment, however both can be made of other materials and provided in other shapes in other embodiments. The upper stop 165 and lower stop 145 are both permanently attached to screw 135, so that both stops 165 and 145 remain at fixed positions on the screw 135, even as the screw rotates. Housed within the handle of lever 125 is a nut 126 that traverses up and down screw 135, depending on the direction in which the screw 135 is turned. In the preferred embodiment, the nut 126 is cylindrical in shape and opposite ends of the cylinder extending through the left and right sides of the lever 125. This design allows the nut 126 to rotate while being held in place within the lever 125, which in turn allows for tilting of the screw 135 and the lever 125 as the lever is raised and lowered. Weight 134 at the base of screw 135 aids with smooth rotation of the screw. The screw 135 extends through large openings in the top and bottom of the lever 125, above and below the nut 126. The openings in the lever 125 are intentionally large so as to allow for tilting of the lever 125 as the lever is raised and lowered. An electric motor 205 that provides rotational power to the screw 135 is attached to the bottom of the gear housing 120. This positioning of the motor 205 allows the present invention to be added to trailers with gas tanks on the front without any interference or obstruction. Electrical power is provided to the motor 205 from the towing vehicles electrical system, in the preferred embodiment. Other power supplies, including batteries, can be used in other embodiments. Gear housing 120 includes multiple gears that enable the motor 205 to turn the screw 135 with the load shown in FIG. 2. The screw 135 preferably has a constant diameter of ¼ inch and 28 threads per inch. The gears and thread pitch allow motor 205 to be a relatively low power, inexpensive electric motor. The gear housing 120 also includes a rocker mechanism for supporting the base of the screw 135. The rocker mechanism allows the screw 135 to tilt slightly while it is being rotated. The small amount of electronic circuitry required for receiving and sending "stop" signals to the electric motor 205 from the upper and lower micro-switches is also stored within the gear housing 120.

Figure 3:
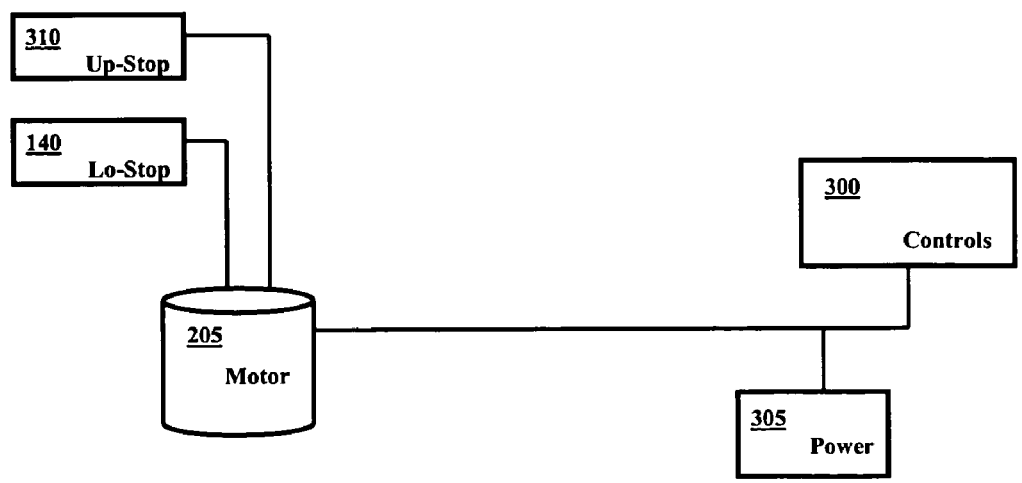
FIG. 3 is a block diagram of the electrical system of the preferred embodiment.

FIG. 3 is a block diagram of the electrical system for the preferred embodiment. The driver's controls 300 are preferably a switch or two-button pad. Power 305 can come for any available junction in the cars electrical system, including a pre-wired "pig-tail" for trailers, or directly from the vehicle's battery. When the driver places the switch in the "compress" position, a current is supplied to the electric motor 205. The current is continually supplied to the motor 310 until a "stop" signal is received from the upper micro-switch 310. When the driver places the switch in the "release" position, a reverse current is supplied to the electric motor 205. The current is again continually supplied to the motor 205 until a "stop" signal is received from the lower micro-switch 140. Upon receipt of any "stop" signal, the motor 205 stops rotating and remains inactive until the driver moves the controls 300 again.

FIG. 4 is a cross-sectional view of the front of the anti-sway bar. The perspective for this view is shown in FIG. 1 by the dark arrows and the number 4. Interior bar 400 is designed to slide freely within the top portion 405 and the bottom portion 410 of the anti-sway bar, when no pressure is applied to the top portion 405 of the bar. In the present invention, when the lever is raised the lever head 130 compresses the interior bar 400 between the top and bottom portions, 405 and 410 respectively, of the anti-sway bar. When the interior bar 400 is compressed it is no longer free to slide in and out of the outer bar, or the anti-sway bar housing. Assisting the lever head 130 in the application of pressure are bolt 415, which is screwed into nut 111, and bolt 420, which is screwed into nut 425. Both nuts 111 and 425 are permanently attached to the bottom portion 410 of the anti-sway bar.

Figure 5:
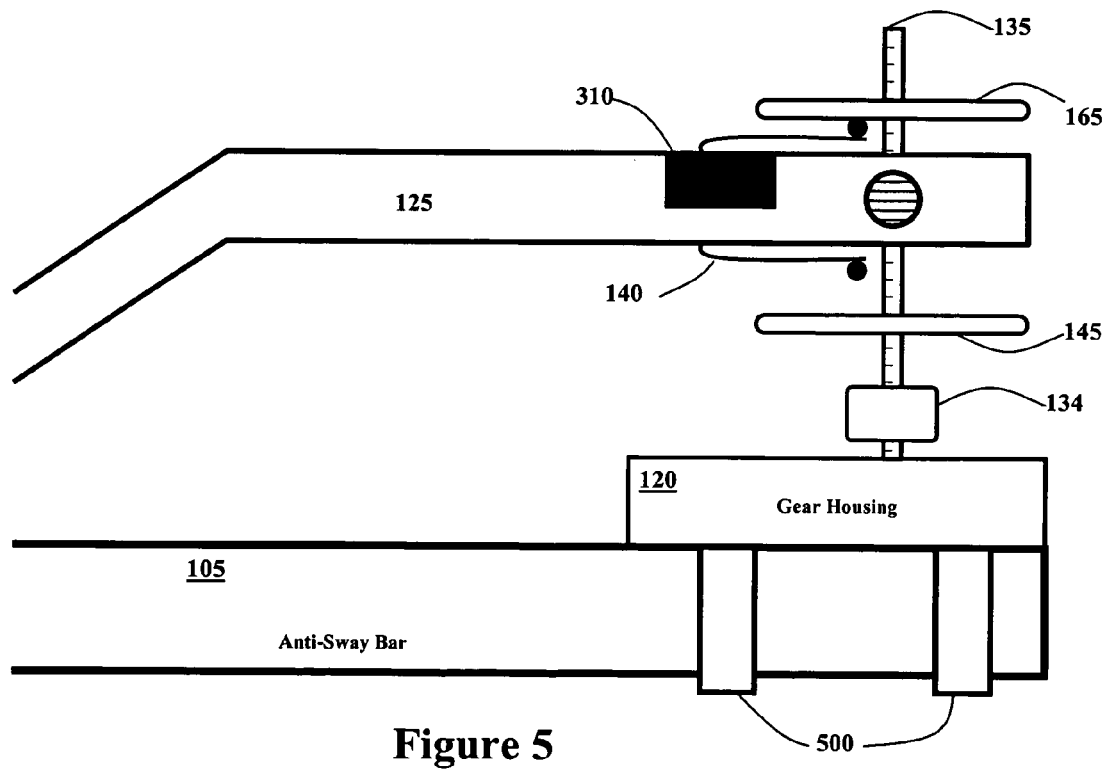

FIG. 5 is a close up side view of the preferred lifting mechanism. This Figure also shows the upper micro-switch 310 in its operational position, on the handle portion of the lever 125. In FIG. 5, the trigger of micro-switch 310 has come into contact with upper stop 165, meaning the lever 125 has been completely lifted and the anti-sway bar 105 is currently in a compressed position. When the driver moves the control switch to the "release" position, the mechanism will cause the handle of the lever 125 to be lowered down the length of the screw 135 until the micro-switch 140 trigger comes into contact with lower stop 145. The gear housing 120, and the rest of the lifting mechanism, are preferably held in place on the anti-sway bar 105 by metal brackets 500. The brackets 500 are pre-sized so that they are able to slide onto any traditional anti-sway bar. Of course, other materials and designs can be used to hold the lifting mechanism in place, in other embodiments.

The foregoing description of the specific embodiments will so fully reveal the general nature of the invention that others can, by applying current knowledge, readily modify and/or adapt for various applications such specific embodiments without departing from the generic concept. For example, a pre-formed plastic cover could easily be fabricated and added for protection. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. A device that is adapted for attachment to an anti-sway bar, the device replacing a hand crank of the anti-sway and being able to serve a same function as the hand crank without any need of manual hand cranking, wherein the device is also adapted to use two bolts that were used to attach the hand crank to the anti-sway bar, the device comprising:
    a lever, the lever having a lever head at one end and a handle at an opposite end, wherein the lever head is attached to the anti-sway bar by the two bolts, and wherein the handle includes a nut that is housed within the handle;
    a lower micro-switch that is attached to a left side of the handle, the lower micro-switch having a lower trigger that extends downward from the handle;
    an upper micro-switch that is attached to a right side of the handle, the upper micro-switch having an upper trigger that extends upward from the handle;
    a screw, the screw having a base that is supported on a top of the anti-sway bar and a length that extends upward, wherein the screw is threaded through the nut in the handle;
    an upper stop that is fixed at a position along the length of the screw that is above the handle;
    a lower stop that is fixed at a position along the length of the screw that is below the handle;
    an electric motor that provides a rotational force for turning the screw, the electric motor being mechanically connected to the screw by one or more gears and being electrically connected to the upper and lower micro-switches; and,
    a control switch that is electrically connected to the motor, the control switch enabling a user to selectively send a first current to the motor that causes the motor to turn in a first direction, and a second current to the motor that causes the motor to turn in a second direction.

2. The device of claim 1, wherein the upper micro-switch sends a first stop signal to the motor when the upper micro-switch contacts the upper stop, the first stop signal causing the first current to stop flowing to the motor.

3. The device of claim 1, wherein the lower micro-switch sends a second stop signal to the motor when the lower micro-switch contacts the lower stop, the second stop signal causing the second current to stop flowing to the motor.

4. The device of claim 1, wherein electrical power is provided to the device from a vehicle's electrical system.

5. The device of claim 1, further comprising a gear housing that surrounds and protects the one or more gears, a lower portion of the screw and circuitry for receiving the stop signals and stopping the flow of the currents, wherein the motor is connected to a bottom portion of the gear housing.

6. The device of claim 5, further comprising a metal bracket that is connected to the gear housing and adapted for holding the gear housing in place, on top of the anti-sway bar.

7. The device of claim 6, wherein the base of the screw extends through a bottom of the gear housing and is cradled by a rocker support that allows the screw to tilt slightly as the screw is rotated.

8. The device of claim 1, wherein the lever has a length that is similar to a length of the anti-sway bar.

9. The device of claim 1, wherein the screw has a constant diameter of one quarter inch.

10. The device of claim 1, wherein the screw has 28 threads per inch.

11. The device of claim 1, further comprising a cover that substantially surrounds the device and provides protection from unwanted debris.

12. The device of claim 1, wherein the lever head has a semi-circle cross section.

13. The device of claim 1, wherein the handle rises approximately two and a half inches above the anti-sway bar when the lever head is bolted to the anti-sway bar.

14. The device of claim 7, wherein the rocker support that cradles the base of the screw is a portion of the metal bracket that holds the gear housing to the anti-sway bar.

15. The device of claim 1, wherein the handle of the lever has a square cross-section and the nut within the handle has a round cross-section.

* * * * *